No. 679,519. Patented July 30, 1901.
L. T. SMITH.
VALVE FOR PNEUMATIC TIRES.
(Application filed Dec. 31, 1900.)

(No Model.)

Witnesses

Inventor
Lyman T. Smith
by Johnson & Johnson
Attorneys

UNITED STATES PATENT OFFICE.

LYMAN T. SMITH, OF NEW HAVEN, CONNECTICUT.

VALVE FOR PNEUMATIC TIRES.

SPECIFICATION forming part of Letters Patent No. 679,519, dated July 30, 1901.

Application filed December 31, 1900. Serial No. 41,650. (No model.)

*To all whom it may concern:*

Be it known that I, LYMAN T. SMITH, a citizen of the United States, residing at New Haven, in the county of New Haven and State of Connecticut, have invented certain new and useful Improvements in Valves for Pneumatic Tires, of which the following is a specification.

For pneumatic tires I have produced an improved valve, whereby the tire may be inflated and the sealing rendered perfect, and the particular improvement will be pointed out in the claims concluding this specification.

Figure 1:
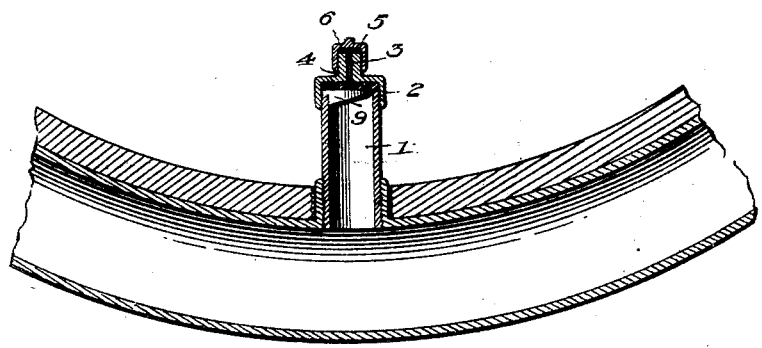
Figure 2:
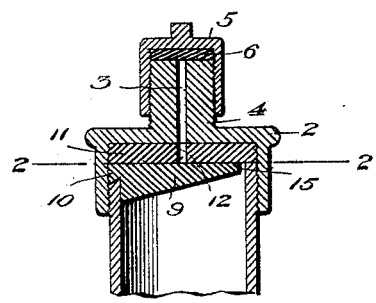
Figure 3:
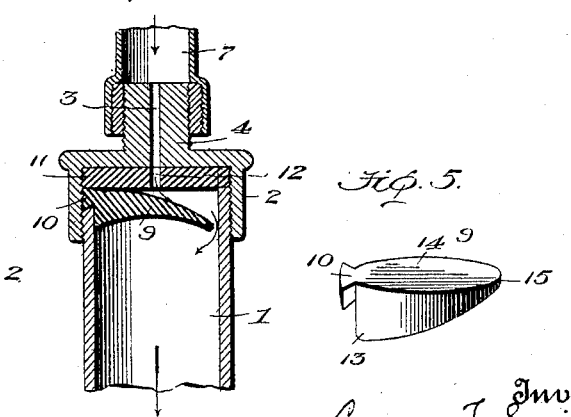
Figure 4:
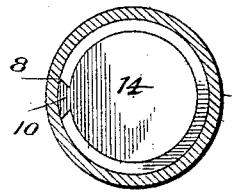
Figure 5:
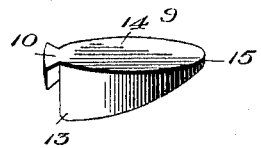

In the accompanying drawings, Figure 1 shows the pneumatic tire in longitudinal section with my improved wedge-shaped sealing-valve applied to the inflating-stem of the tire when the latter is sealed. Fig. 2 is an enlarged sectional view of the valve and a portion of the inflating-stem. Fig. 3 is a view similar to Fig. 2, showing the valve opened by the incoming air from the pump-tube. Fig. 4 is a section on the line 2 2 of Fig. 2, the valve being shown in elevation. Fig. 5 is a perspective view of the valve-disk, showing its thick heel part, its thin bendable part, and the relation of its hanging arm to the heel-wall.

A tubular valve-stem 1 is secured to the tire in any suitable way and projects through to the inner side of the felly of the wheel. It has an external screw-thread at its projecting end, upon which a cap 2, having an interior screw-thread, is engaged. A central bore 3 in the cap 2 forms the inlet and outlet for the air. The cap 2 is formed with a reduced screw-threaded neck or top part 4, upon which is fitted a dust-proof interiorly-screw-threaded cap 5, having an interior washer 6. In inflating the tire the dust-proof cap 5 is removed and a pipe 7, Fig. 3, leading from a pump or compressed-air tank, is attached to the top part 4 of the cap 2. The cap 2 is not removed from the valve-stem 1 except when it is required to renew the wedge-shaped disk valve presently described.

The top edge of the tubular valve-stem 1 is notched or dovetailed at 8, Fig. 4, and a wedge-shaped disk valve 9, made, preferably, of rubber and having a dovetail projection 10 projecting from its thickest edge near the top, is placed in the top of said stem, its dovetail projection or lip 10 fitting tightly in the dovetail notch 8 of the stem. The cap 2 is screwed down on the valve-stem 1 and presses the dovetail projection 10 of the disk valve tightly into the notch 8 in the top of the stem, thereby securing the disk valve in place. An interior washer 11, having a central hole 12 corresponding to the hole 3 in the cap, is preferably fitted in the cap to seal the connection between the stem 1 and the cap 2.

The essential feature of my invention lies in the novel construction and action of the rubber valve-disk 9. As shown in Fig. 5, the disk valve is in the form of a wedge, the edge 13 of its thickest portion being at right angles to the top 14, and has a dovetailed lip 10 projecting from its thickest edge near the top, the thinnest portion of the wedge being at a point diametrically opposite the dovetailed securing lip or projection 10, by which the valve is hung.

The dust-proof cap being removed and the pump-pipe being attached the air from the pump is then forced down through the hole 3 in the cap 2, and pressing on the top 14 of the disk valve 9 depresses or bends its thinnest edge 15 away from its sealing-seat on the interior of the cap 2, as seen in Fig. 3. When the thinner edge of the valve-disk is bent away from its seat by the incoming air, the lower portion of the thicker edge 13 is compressed against the inner side of the valve-stem, so that the instant the pressure from the pump is relieved the disk will assume its normal position, as seen in Fig. 2. This is by reason of the tendency of the rubber disk valve to assume its normal position or shape after being bent at its thinner edge and compressed at its thicker edge. The valve-disk being self-seating at its heel part, the sealing of the valve is further perfected by the back pressure of the air from the tire on the bottom of the disk.

I claim—

1. A valve for pneumatic tires comprising a tubular stem part having a dovetailed notch in its top edge, a flexible wedge-shaped disk valve seated in the top thereof, and having a dovetailed projection or lip from its thickest edge adapted to engage tightly in the notch of the stem, and a screw-threaded cap having a central bore adapted to fit over the tubular stem part and secure said disk valve in place in sealing relation to the hole in said cap.

2. A valve for pneumatic tires comprising a screw-cap having an air-hole in its head, a tubular screw-stem having a dovetailed notch in its upper edge and a flexible wedge-shaped disk valve having a dovetailed projection from its thickest edge adapted for engagement with said dovetailed notch, said wedge-shaped disk valve being interposed between the tubular stem and the interior of the cap.

3. In a valve for pneumatic tires, a tubular screw-stem having a notch in its upper edge, a screw-cap, and a flexible wedge-shaped disk valve having a hanging lip projecting from the upper part of its thickest edge and adapted to engage the notch in the screw-stem whereby it is horizontally suspended in the top of the screw-stem and interposed between said stem and cap to seal the opening in said cap.

4. A valve for pneumatic tires consisting of a rubber disk formed with a thick heel part standing at right angles to its sealing-surface, its opposite surface inclined from the heel and thereby forming a thin bendable part, the heel formed with a hanging part above the inclined surface.

In testimony whereof I affix my signature in presence of two witnesses.

LYMAN T. SMITH.

Witnesses:
HERMAN E. SMITH,
FRED R. WARD.